US012592908B2

(12) United States Patent
Andreasen et al.

(10) Patent No.: US 12,592,908 B2
(45) Date of Patent: Mar. 31, 2026

(54) SYSTEM AND METHOD OF PROVIDING A POLICY-BASED ENTERPRISE STATIC IDENTITY ASSIGNMENT

(71) Applicant: Cisco Technology, Inc., San Jose, CA (US)

(72) Inventors: Flemming Stig Andreasen, Marlboro, NJ (US); Timothy P. Stammers, Raleigh, NC (US); Dusko Zgonjanin, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/669,002

(22) Filed: May 20, 2024

(65) Prior Publication Data

US 2025/0358258 A1    Nov. 20, 2025

(51) Int. Cl.
H04L 61/5053 (2022.01)
H04L 61/5007 (2022.01)

(52) U.S. Cl.
CPC ...... H04L 61/5053 (2022.05); H04L 61/5007 (2022.05)

(58) Field of Classification Search
CPC .................... H04L 61/5053; H04L 61/5007
See application file for complete search history.

(56) References Cited

U.S. PATENT DOCUMENTS

| 6,957,276 | B1 * | 10/2005 | Bahl | .................. H04L 61/5014 709/227 |
| 7,277,416 | B1 * | 10/2007 | Chang | .................... H04W 8/26 370/338 |
| 8,161,190 | B2 * | 4/2012 | Ringen | ................ H04L 45/033 370/254 |
| 8,285,875 | B2 * | 10/2012 | Gandhewar | ........ H04L 61/5014 370/252 |
| 2009/0061869 | A1 | 3/2009 | Bui et al. | |
| 2010/0202351 | A1 | 8/2010 | Xi et al. | |
| 2020/0288424 | A1 | 9/2020 | Grayson et al. | |
| 2021/0084007 | A1 | 3/2021 | Cao et al. | |
| 2022/0311768 | A1 * | 9/2022 | Hoewisch | .......... H04L 63/0876 |

* cited by examiner

*Primary Examiner* — Alex Tran
(74) *Attorney, Agent, or Firm* — Polsinelli P.C.

(57) ABSTRACT

A system for managing addresses for a device includes at least one processor; and a computer-readable storage medium storing instructions which, when executed by the at least one processor, cause the at least one processor to be configured to: receive, at a network component of a network, data regarding a device; perform analysis of the device based on the data; based on the analysis, trigger a request to an address management system for the network; reprovision, based on the request, a subscription profile for the device with a selected Internet Protocol (IP) address to be used by the device; deregister the device from the network; reconnect the device to the network; and assign and transmit the selected IP address to the device.

20 Claims, 6 Drawing Sheets

300

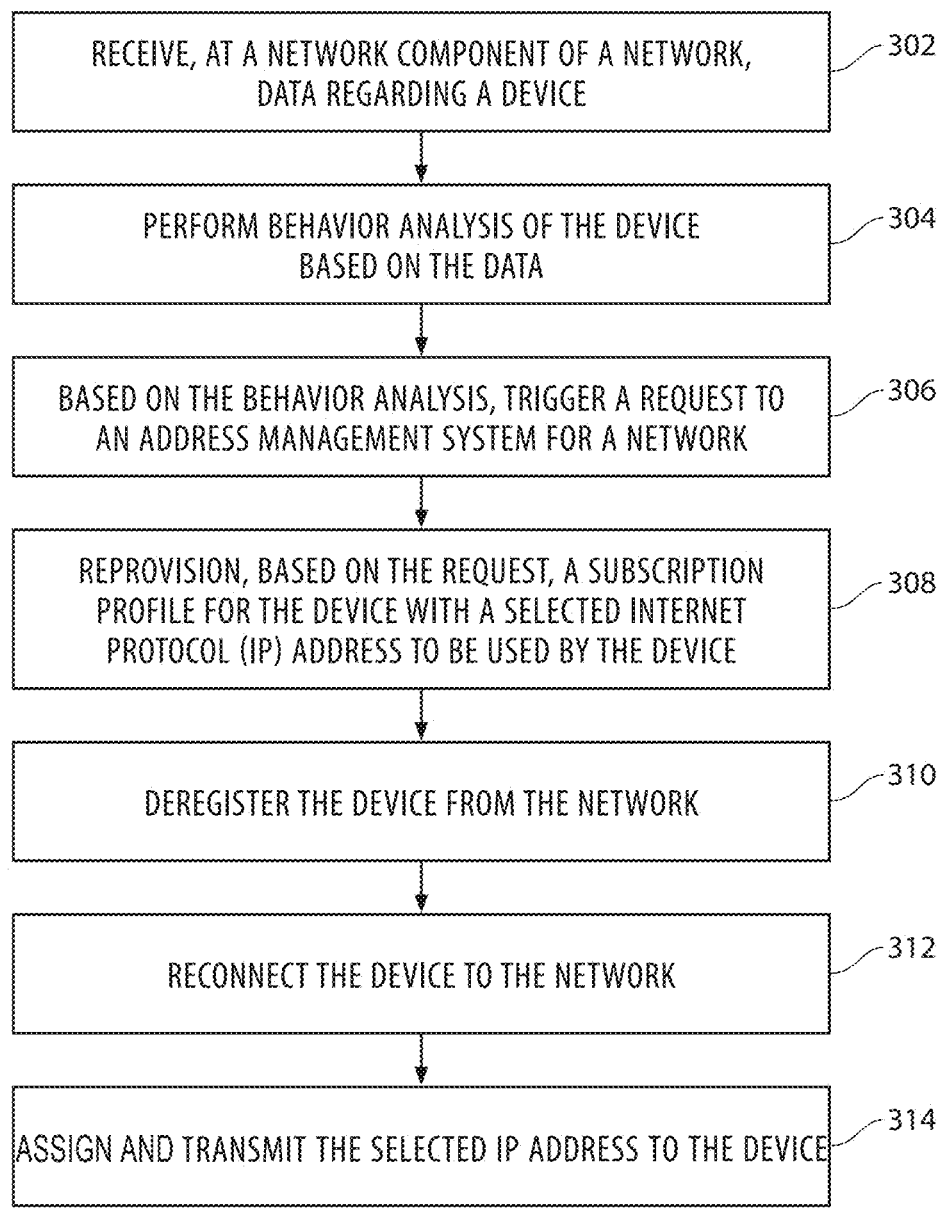

RECEIVE, AT A NETWORK COMPONENT OF A NETWORK, DATA REGARDING A DEVICE ⟋302

PERFORM BEHAVIOR ANALYSIS OF THE DEVICE BASED ON THE DATA ⟋304

BASED ON THE BEHAVIOR ANALYSIS, TRIGGER A REQUEST TO AN ADDRESS MANAGEMENT SYSTEM FOR A NETWORK ⟋306

REPROVISION, BASED ON THE REQUEST, A SUBSCRIPTION PROFILE FOR THE DEVICE WITH A SELECTED INTERNET PROTOCOL (IP) ADDRESS TO BE USED BY THE DEVICE ⟋308

DEREGISTER THE DEVICE FROM THE NETWORK ⟋310

RECONNECT THE DEVICE TO THE NETWORK ⟋312

ASSIGN AND TRANSMIT THE SELECTED IP ADDRESS TO THE DEVICE ⟋314

FIG. 3A

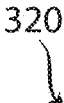

320

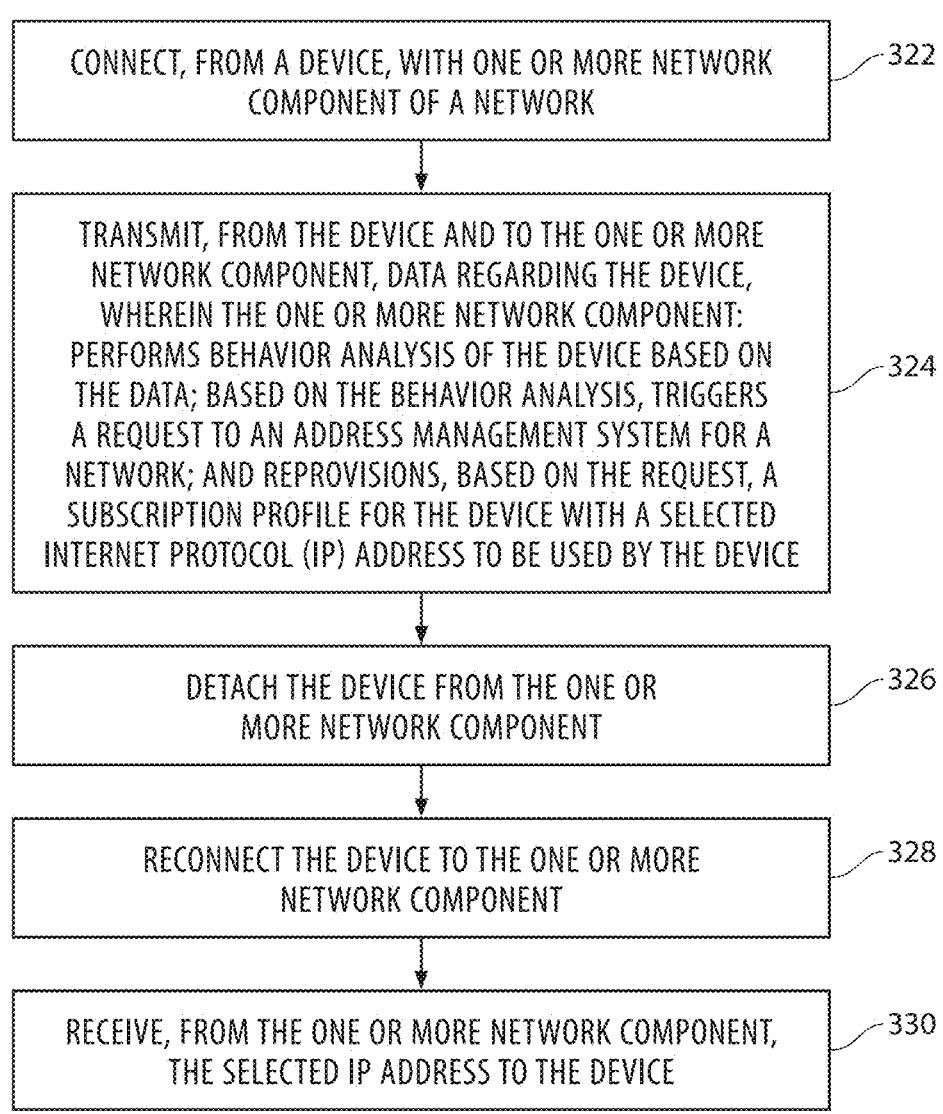

CONNECT, FROM A DEVICE, WITH ONE OR MORE NETWORK COMPONENT OF A NETWORK — 322

TRANSMIT, FROM THE DEVICE AND TO THE ONE OR MORE NETWORK COMPONENT, DATA REGARDING THE DEVICE, WHEREIN THE ONE OR MORE NETWORK COMPONENT: PERFORMS BEHAVIOR ANALYSIS OF THE DEVICE BASED ON THE DATA; BASED ON THE BEHAVIOR ANALYSIS, TRIGGERS A REQUEST TO AN ADDRESS MANAGEMENT SYSTEM FOR A NETWORK; AND REPROVISIONS, BASED ON THE REQUEST, A SUBSCRIPTION PROFILE FOR THE DEVICE WITH A SELECTED INTERNET PROTOCOL (IP) ADDRESS TO BE USED BY THE DEVICE — 324

DETACH THE DEVICE FROM THE ONE OR MORE NETWORK COMPONENT — 326

RECONNECT THE DEVICE TO THE ONE OR MORE NETWORK COMPONENT — 328

RECEIVE, FROM THE ONE OR MORE NETWORK COMPONENT, THE SELECTED IP ADDRESS TO THE DEVICE — 330

FIG. 3B

SYSTEM AND METHOD OF PROVIDING A POLICY-BASED ENTERPRISE STATIC IDENTITY ASSIGNMENT

FIELD OF THE INVENTION

The present disclosure relates to a new approach to enabling the assignment of an Internet Protocol (IP) address to a device, which can be a static IP address. The assignment can occur based on device behavior analysis and after establishing a session with the device.

BACKGROUND

A number of enterprise applications, particularly in the operations technology domain, require a device to have a long-lived permanent network address in order to identify the device within an application. Typically, the network address is the Internet Protocol (IP) address assigned to the device. Some enterprises, using dynamic host configuration protocol (DHCP) procedures, may use long-lived or infinite leases of IP addresses. Such leases can be problematic in some instances such as when a failed device needs to be replaced yet retains an old IP address.

With the introduction of private cellular access networks for the operations technology domain or other domains, similar requirements apply. In a cellular network, the IP address assignment method is determined by a combination of the subscription profile, identified by IMSI, and the data service, identified by the Data Network Name (DNN). If the subscription profile contains a static IP address, that is used; otherwise, dynamic IP address assignment occurs.

The decision to use a static address is not determined at session establishment time. Rather, the decision is made when the profile is provisioned and the network configured. What results is the following set of problems: 1. Each device requiring a long term static IP address assignment must be identified ahead of time; 2. For each identified device, a subscription, keyed by the International Mobile Subscriber Identity (IMSI), must be prepared containing a static IP address; and 3. The subscription identified by the IMSI must be associated with the device, either by plugging in the correct SIM (subscriber identity module) using that IMSI to the device or provisioning an eSIM profile using an IMSI where the profile contains a static IP address assignment.

BRIEF DESCRIPTION OF THE SEVERAL VIEWS OF THE DRAWINGS

Illustrative aspects of the present application are described in detail below with reference to the following figures:

FIG. 3A illustrates an example method according to an aspect of this disclosure.

FIG. 3B illustrates another example method from the standpoint of the device according to an aspect of this disclosure.

DETAILED DESCRIPTION

Figure 1:
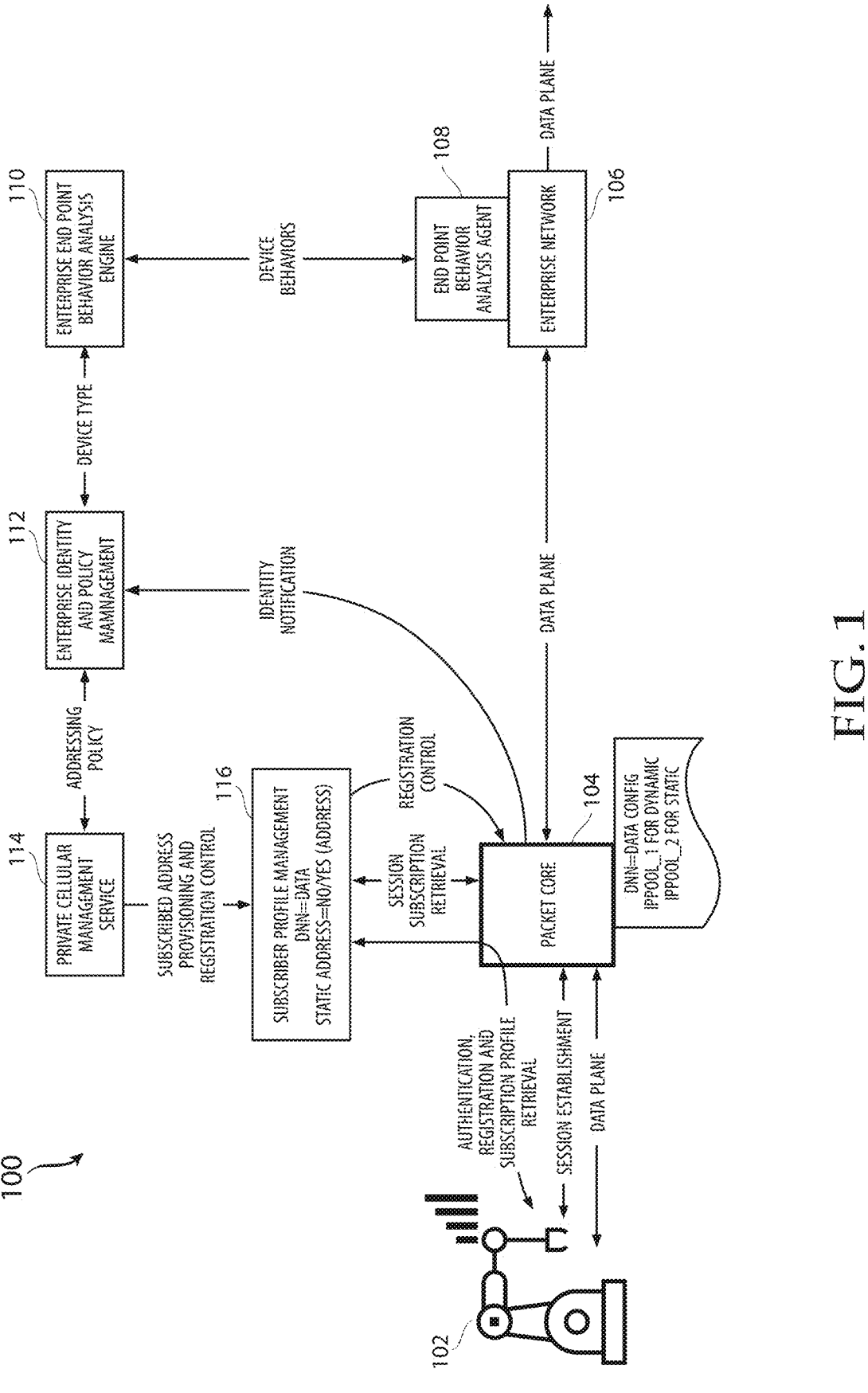
FIG. 1 illustrates a block diagram of the various operations for provisioning a static IP address, in accordance with an aspect of this disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

As noted above, there are problems that arise from using DCHP and assigning a long-lived permanent network address in some contexts. These problems include that each device must have its long term static IP address assignment identified ahead of time. A subscription, keyed by IMSI, further must be prepared containing a static IP address. Then, the subscription identified by the IMSI must be associated with the device, either by plugging in the correct SIM using that IMSI to the device or provisioning an eSIM profile using an IMSI where the profile contains a static IP address assignment. Cellular network standards do support DHCP-based address assignment using external DHCP servers available in an enterprise network. However, support is not implemented consistently across products. Furthermore, a packet core gateway acts as the DHCP client to the enterprise DHCP server, so additional details available from the device in the typical enterprise case are not available. These details may be used by the enterprise network to assist the determination that an infinite lease address (static) is required for that device.

What is needed in the art is an approach to modifying the address assignment methodology based on device behavior analysis post session establishment. This disclosure proposes to solve the above problems by identifying a device as needing static IP address assignment post session establishment. The timing of the assignment removes the need for performing a priori identification and subscription provisioning steps required with the present art. The identification can for example be based on active probing or passive monitoring with associated behavior analysis. With active probing, the system probes or queries the device directly rather than from passive monitoring of the traffic. Based on the device identification, the enterprise will indicate the need for static address assignment for the device to the cellular access network. The cellular access network will identify the subscription being used by the device, provision an appropriate static IP address to the associated subscription profile and trigger a session disconnect. The device will re-establish the session and be assigned the static IP address delivered to the cellular packet core in the subscription profile.

In some aspects, the techniques described herein relate to a method including: receiving, at a network component of a network, data regarding a device; performing behavior analysis of the device based on the data; based on the behavior analysis, triggering a request to an address management system for the network; reprovisioning, based on the request, a subscription profile for the device with a selected Internet Protocol (IP) address to be used by the device; deregistering the device from the network; reconnecting the device to the network; and transmitting the selected IP address to the device.

In some aspects, the techniques described herein relate to a system for managing addresses for a device, the system including: at least one processor; and a computer-readable storage medium storing instructions which, when executed by the at least one processor, cause the at least one processor to be configured to: receive, at a network component of a network, data regarding a device; perform analysis of the device based on the data; based on the analysis, trigger a request to an address management system for the network; reprovision, based on the request, a subscription profile for the device with a selected Internet Protocol (IP) address to be used by the device; deregister the device from the network; reconnect the device to the network; and transmit the selected IP address to the device.

In some aspects, the techniques described herein relate to a computer-readable storage medium storing instructions which, when executed by at least one processor, cause the at least one processor to be configured to: receive, at a network component of a network, data regarding a device; perform behavior analysis of the device based on the data; based on the behavior analysis, trigger a request to an address management system for the network; reprovision, based on the request, a subscription profile for the device with a selected Internet Protocol (IP) address to be used by the device; deregister the device from the network; reconnect the device to the network; and transmit the selected IP address to the device.

In some aspects, the techniques described herein relate to a method including: connecting, from a device, with one or more network component of a network; transmitting, from the device and to the one or more network component, data regarding the device, wherein the one or more network component: performs behavior analysis of the device based on the data; based on the behavior analysis, triggers a request to an address management system for the network; and reprovisions, based on the request, a subscription profile for the device with a selected Internet Protocol (IP) address to be used by the device; detaching the device from the one or more network component; reconnecting the device to the one or more network component; and receiving, from the one or more network component, the selected IP address to the device.

In some aspects, the techniques described herein relate to a system for managing addresses for a device, the system including: at least one processor; and a computer-readable storage medium storing instructions which, when executed by the at least one processor, cause the at least one processor to be configured to: connect, from a device, with one or more network component of a network; transmit, from the device and to the one or more network component, data regarding the device, wherein the one or more network component: performs behavior analysis of the device based on the data; based on the behavior analysis, triggers a request to an address management system for the network; and reprovisions, based on the request, a subscription profile for the device with a selected Internet Protocol (IP) address to be used by the device; detach the device from the one or more network component; reconnect the device to the one or more network component; and receive, from the one or more network component, the selected IP address to the device.

In some aspects, the techniques described herein relate to a computer-readable storage medium storing instructions which, when executed by at least one processor, cause the at least one processor to be configured to: connect, from a device, with one or more network component of a network; transmit, from the device and to the one or more network component, data regarding the device, wherein the one or more network component: performs behavior analysis of the device based on the data; based on the behavior analysis, triggers a request to an address management system for the network; and reprovisions, based on the request, a subscription profile for the device with a selected Internet Protocol (IP) address to be used by the device; detach the device from the one or more network component; reconnect the device to the one or more network component; and receive, from the one or more network component, the selected IP address to the device.

This brief introduction is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

EXAMPLE EMBODIMENTS

Disclosed herein is an approach to enable a change in the behavior of the network to modifying the address assignment methodology based on device behavior analysis post session establishment. The approach of identifying the device as needing static IP address assignment post session establishment is novel and addresses the various problems with the existing IP address assignment protocol.

The initial identification of the device can for example be based on active probing or passive monitoring with associated behavior analysis. In some cases, the initial data communicated from the device will not identify the device type and thus an analysis of the device behavior is needed to carry out the novel features disclosed herein. Based on the device identification, the enterprise or network will indicate the need for static address assignment for the device to the cellular access network. The cellular access network will identify the subscription being used by the device, provision an appropriate static IP address to the associated subscription profile and trigger a session disconnect. The device will re-establish the session and be assigned the static IP address delivered to the cellular packet core in the subscription profile.

The context or application of the principles disclosed herein can apply to devices which can include, but are not limited to, any device related to operations technology context, mobile devices, computers, non-mobile devices, Internet-of-Things devices such as robots, slow moving devices, vehicles, drones, flying vehicles, devices in connection with production lines, mines, conveyer belts and so forth.

Figure 4:
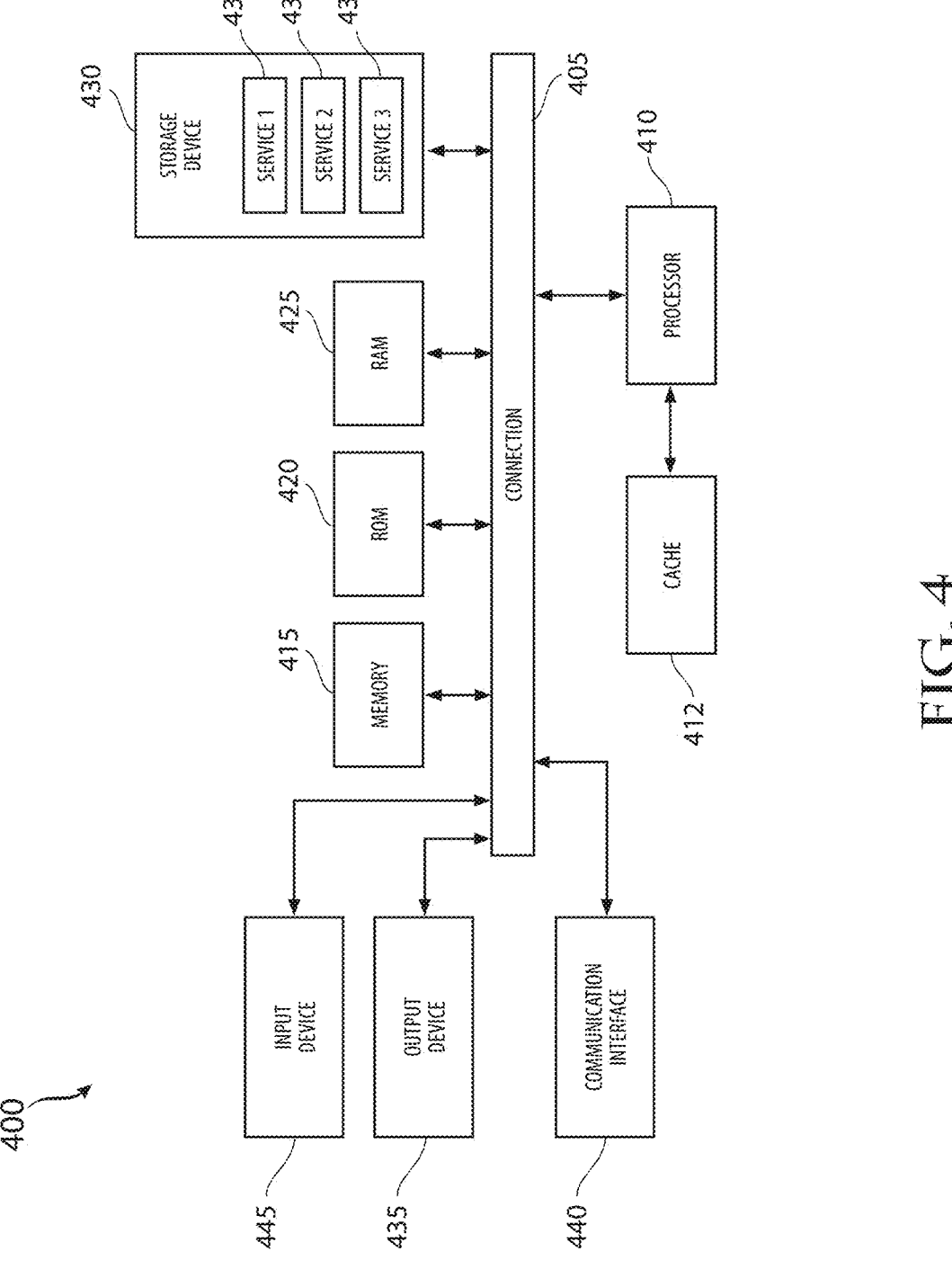
FIG. 4 shows an example of a system for implementing certain aspects of the present technology.

FIG. 1 illustrates a set of functional blocks 100 that identify operations that are implemented to address the problems outlined above. The functional blocks can be carried out by a computing system 400 (as shown in FIG. 4), or any network-based component in a cellular network such as a 5G, 6G, LTE or any other cellular network. Any network that requires a device address to connect to the network can also utilize the principles disclosed herein. In some cases as well, a company may establish a private cellular network and the examples disclosed herein are generally in the context of the private cellular network with an enterprise network back-end.

A company operating an enterprise network can be notified of the assigned address for the device via an identity notification using standard Radius (Remote Authentication Dial-in User Service) messaging which is a protocol that provides centralized authentication and authorization and can include accounting features as well.

As noted above, one issue depending on the context of the use of devices is the removal and replacement of a device from a network. In the case of a device removal, the number that is used to uniquely identify the subscription for a device in the network (the IMSI) will no longer be active in the system and hence the static IP address can be reclaimed.

Alternatively, an explicit signaling method can be supported between the enterprise network and the cellular access network in accordance with the diagram of FIG. 1. In the case of device replacement, there may be a need for the new device to use the IP-address that was previously assigned to the old/failed device. In such cases, the enterprise network will indicate the need for a new device to take over the address for the old device to the cellular access network.

As shown in FIG. 1, the device 102 establishes a session with a packet core 104. There are aspects of a cellular network that are not included in FIG. 1 but one of skill in the art would understand to be part of the network such as a base station or gNB (5G next generation node B) and other network components. A flag may be set or detected which relates to whether the network will use a dynamic IP address or a static IP address assigned for a given subscription and associated data service. In 5G, for example, the Data Network Name (DNN) is used to identify the data service, which can be customized. Here, the DNN may refer to data configuration including address pool. For example, an IPPool_1 may have a flag set for dynamic IP address assignment and IPPool_2 for a static IP address assignment. When dynamic assigned is used as described herein, via the data plane, the packet core 104 can communicate such with an enterprise network 106 which can implement an endpoint behavior analysis agent 108. The endpoint behavior analysis agent 108 can obtain data about the behavior of the device 102 or may also obtain or analyze the data it receives from the packet core 104 to determine device behaviors.

For example, the device 102 may exhibit some behaviors that it is about to fail or it might exhibit other behaviors that may indicate that it should receive a static IP address. Some behavior may simply be a device identifier so that the type of the device may be determined. However, the data that is transmitted may not be configured or currently arranged to be able to simply report or identify the device type. Thus, such information may need to be inferred from the other type of data that is transmitted via the data plane. The behaviors can be analyzed by an enterprise endpoint behavior analysis engine 110. In some cases, the device type can then be determined and reported to an enterprise identity and policy management engine 112. As part of this process, the packet core 104 may report directly to the enterprise identity and policy management engine 112 with a notification of the identification of the device if that information is available directly or can be extracted from the data provided by the device 102.

The enterprise identity and policy management engine 112 determines an addressing policy (e.g., such as to use a static address assignment with DNN service 'data') that is to be used for the device and transmits the addressing policy to an address management system 114 which can be a private cellular management service. In one aspect, this disclosure applies to a private cellular network (PCN) that is a dedicated wireless communication system that uses 4G LTE or 5G technology to provide dedicated coverage for a specific area. Although a PCN is described in one example here, the principles can apply to any cellular network or any network that uses assigned addresses and IP addresses are one non-limiting example.

The address management system 114 initiates a subscriber address provisioning and registration control process which can include subscriber profile management 116 in which the DNN is assigned to be "data" and a parameter for a static is assigned to be either No or Yes for the address. In other words, the address management system 114 changes the character of IP address assignment for the device 102. When an address (static or dynamic) is to be assigned, there is a process in which for the device 102 an authentication, registration and subscription profile retrieval step, a session subscription retrieval step and a registration control operation between the subscriber profile management 116 and the packet core 104. The address management system 114 determines the subscription profile for the device 102 based on the identity of the request and reprovisions the subscription profile with a selected static IP address to be used by the device 102.

Subsequently, the network causes a deregistration or detachment of the device 102 from the packet core 104 (or the network in general) in order for the device to reconnect and receive the static IP address assignment.

In some cases, the enterprise network 106 and policy management function can determine and tell the private cellular management server which address to use based on the address assigned to a device that is being replaced. The enterprise network 106 that triggered the request to the address management system 114 for a new device can take over the address assigned previously for another device if desired. The address management system 114 can be associated with a cellular network, a WiFi network, a private cellular network, or any wireless or wired communication network and utilize the principles disclosed herein.

Figure 2:
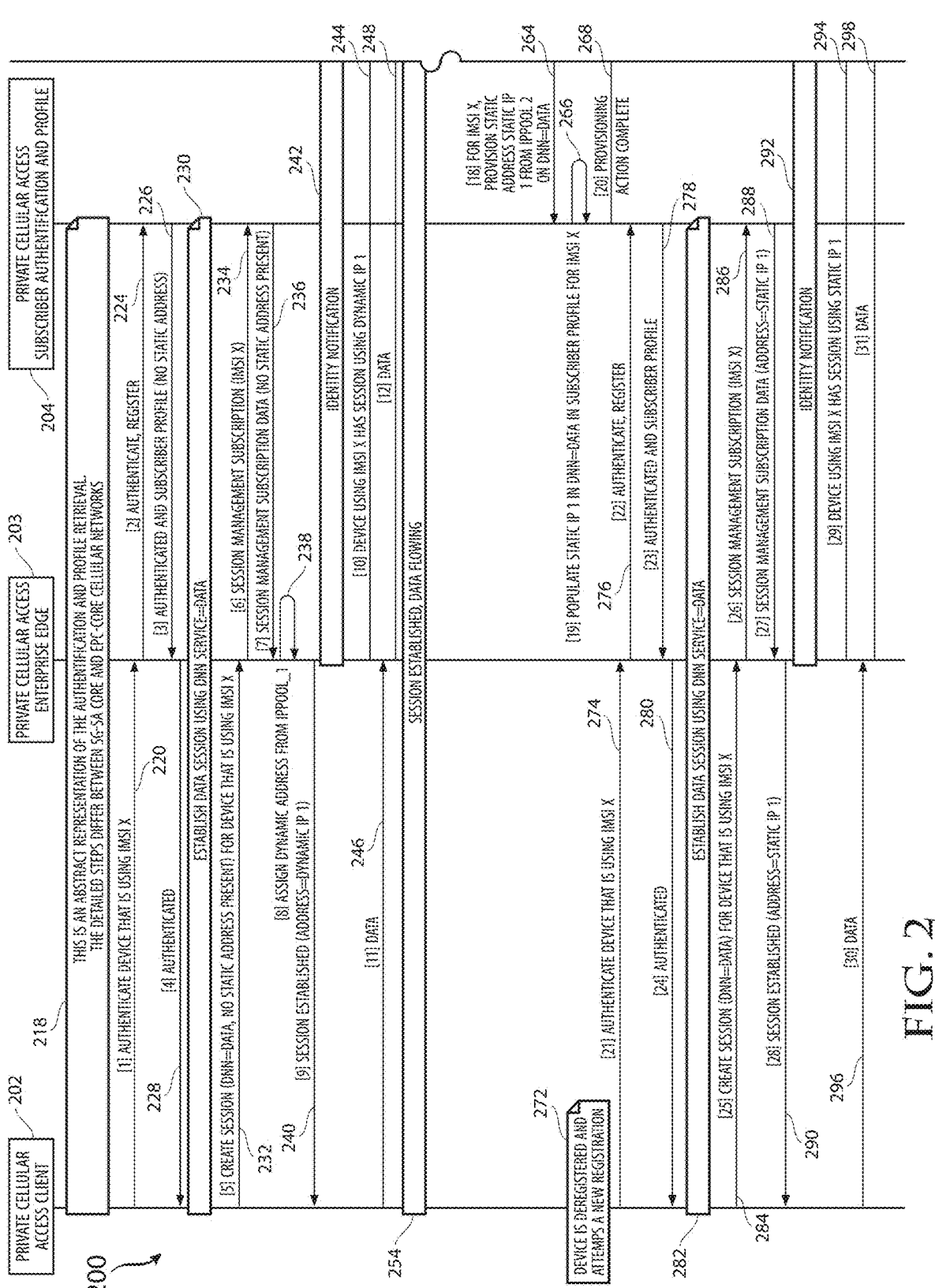
FIG. 2 illustrates a flow diagram describing in detail the steps used for provisioning the static IP address to the device, in accordance with an aspect of this disclosure.
Figure 2:
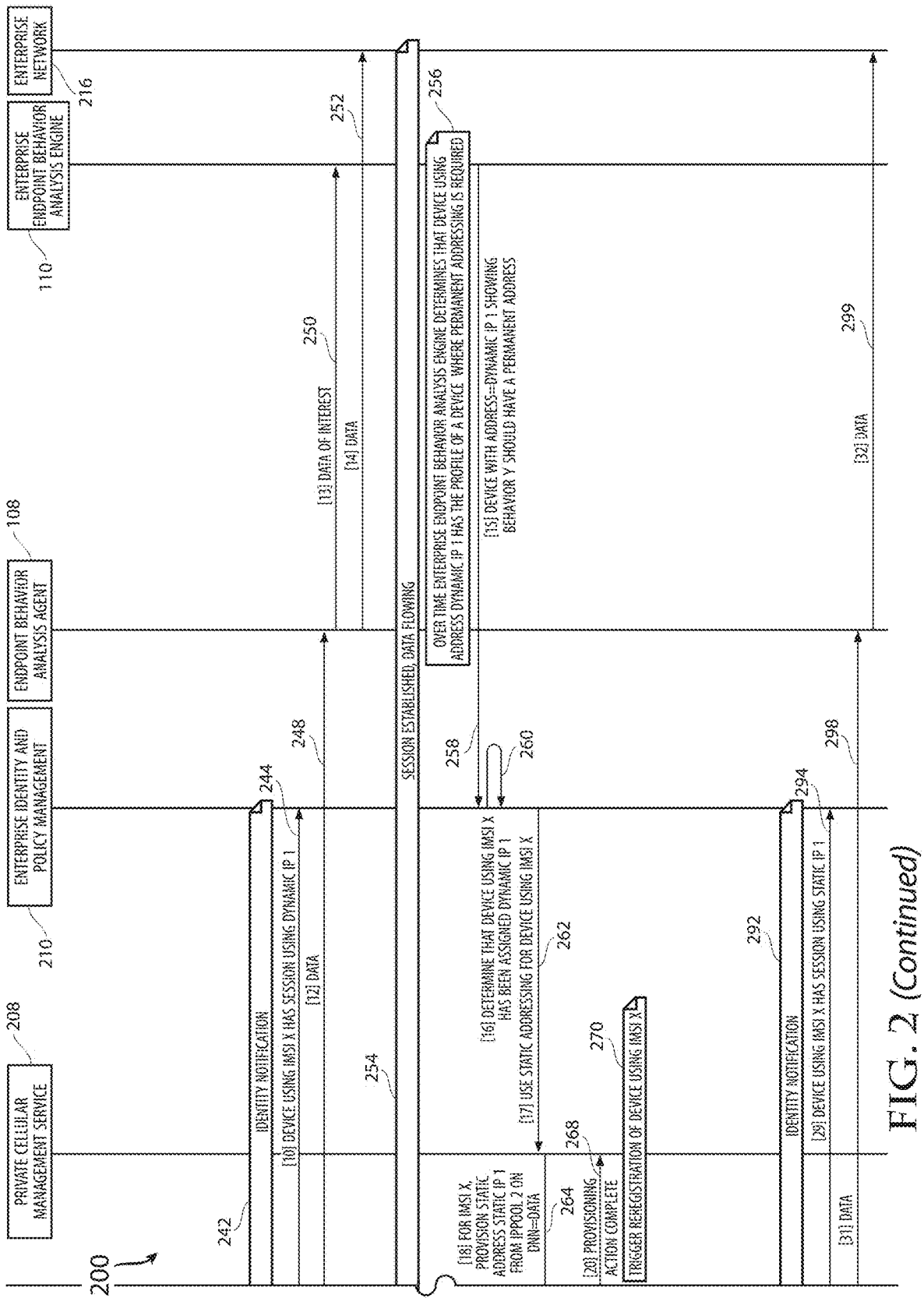

FIG. 2 illustrates an example flow of operations 200 in more detail. The example provided relates to a private cellular network and communication between its clients and edge components and other components. However, as noted above, the principles expressly can apply to any cellular network or any wireless or wired network in which devices are assigned an identifier such as an IP address. First, a private cellular access client 202 requests authentication 220, which can be done using IMSI or any unique identifier which can be any identifier "X", from a private cellular access enterprise edge 203. The private cellular access enterprise edge 203 requests authentication and a registration 224 from a private cellular access subscriber authentication and profile engine 204. The approach represents an abstract representation of the authentication and profile retrieval. The detailed steps can vary between a 5G-SA (5G standalone) core and an EPC (Evolved Packet Core)-Core cellular network 218.

The private cellular access subscriber authentication and profile engine 204 authenticates and obtains the subscriber profile 226 for the private cellular access client 202 and shares the data with the private cellular access enterprise edge 203. The private cellular access enterprise edge 203 confirms via an authentication signal 228 that the private cellular access client 202 is authenticated.

The flow of operations 200 includes a state where a data session is established using DNN Service=data 230. Next, a session is created via a signal 232 with DNN=data, and no static address is present for the device that is using IMSI X and between the private cellular access client 202 and the private cellular access enterprise edge 203. A session management subscription request for the IMSI X is requested via a signal 234 from the private cellular access subscriber authentication and profile engine 204. The private cellular access subscriber authentication and profile engine 204 returns session management subscription data 236 (which can indicate that no static address is present) to the private cellular access enterprise edge 203. The private cellular access enterprise edge 203 can then assign a dynamic address from IPPOOL_1 via a signal 238 and establish a session 240 with the private cellular access client 202 using address=Dynamic IP 1.

Next, an identity notification process 242 is performed. The private cellular access enterprise edge 203 sends a signal 244 to the enterprise identity and policy management engine 210 informing it that the private cellular access client 202 using IMSI X has established a session using dynamic IP 1. Once the session is established, data can start flowing 254 between the private cellular access client 202 and the enterprise network 216. Data transmitted via a signal 246 between the private cellular access client 202 and the private cellular access enterprise edge 203 is made available via a signal 248 to an endpoint behavior analysis agent 108. Data of interest for endpoint behavior analysis is provided to an endpoint behavior analysis engine. Data of interest is provided via a signal 250 to an enterprise endpoint behavior analysis engine 110 and data is provided via a signal 252 to an enterprise network 216. In some aspects, the enterprise network 216 can correspond to the enterprise network 106 shown in FIG. 1.

Over time, the enterprise endpoint behavior analysis engine 110 determines that the device using the address dynamic IP 1 has the profile of a device where permanent, i.e., static, addressing is required as indicated in note 256. The enterprise endpoint behavior analysis engine 110 notifies the enterprise identity and policy management engine 210 of the fact that the device with the dynamic IP 1 address showing the particular behavior "Y" should have a permanent address (signal 258). The "Y" behavior can refer to any determined or analyzed behavior of the private cellular access client 202 such as its movement, its capabilities, characteristics of the data or the specific data transmitted from the private cellular access client 202. The enterprise identity and policy management engine 210 determines that the device using the IMSI X has been assigned the address dynamic IP 1 as indicated in arrow 260. The enterprise identity and policy management engine 210 informs the private cellular management service 208 to use static addressing for the device using IMSI X (signal 262). Next, for IMSI X, the private cellular management service 208 provisions a static address static IP 1 from IPPOOL 2 on DNN=data (signal 264). The private cellular access subscriber authentication and profile engine 204 populates the static IP 1 for DNN=data in the subscriber profile for IMSI X (signal 266). The private cellular access subscriber authentication and profile engine 204 confirmed with the private cellular management service 208 the completion of the provisioning action 268. Next is the process 270 of triggering the reregistration of the private cellular access client 202 using IMSI X. The private cellular access client 202 is deregistered and attempts a new registration 272. The private cellular access client 202 seeks to authenticate via a signal 274 using IMSI X at the private cellular access enterprise edge 203. An authenticate, register message 276 is transmitted from the private cellular access enterprise edge 203 to the private cellular access subscriber authentication and profile engine 204. The private cellular access subscriber authentication and profile engine 204 confirms via a signal 278 to the private cellular access enterprise edge 203 that the device is authenticated and provides a subscriber profile. An authenticated message 280 is transmitted from the private cellular access enterprise edge 203 to the private cellular access client 202.

Next, the flow will establish a data session using the DNN service=data (process 282). The private cellular access client 202 creates a session with DNN=data for the device that is using IMSI X (signal 284). A request 286 for a session management subscription for IMSI X is transmitted from the private cellular access enterprise edge 203 to the private cellular access subscriber authentication and profile engine 204. The private cellular access subscriber authentication and profile engine 204 then transmits to the private cellular access enterprise edge 203 session management subscription data with the address being static IP 1 via a signal 288. The private cellular access enterprise edge 203 transmits a notice 290 to the private cellular access client 202 of the established session with the address being static IP 1. Next, an identity notification 292 occurs and the data that the device using IMSI X has a session using static IP 1 is transmitted via a signal 294 from the private cellular access enterprise edge 203 to the enterprise identity and policy management engine 210.

Next, the private cellular access client 202 transmits data 296 as part of a session to the private cellular access enterprise edge 203, which transmits the data 298 to the endpoint behavior analysis agent 108 which then transmits the data 299 to the enterprise network 216.

FIG. 3A is a flowchart illustrating a process 300 for assigning an IP address to a device. The process 300 can be performed by one or more of a computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof.

At block 302, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does receive, at a network component of a network, data regarding a device. In some aspects, the network component can include one of a packet core and an enterprise network.

At block 304, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does perform analysis of the device based on the data.

At block 306, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does based on the analysis, trigger a request to an address management system for the network. In some aspects, the analysis is associated with one or more of a device behavior, the data regarding the device, an artificial intelligence analysis of the data regarding the device. When the analysis identifies a device type, the method can include triggering, based on the device type, the request to the address management system for the network.

At block 308, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does reprovision, based on the request, a subscription profile for the device with a selected Internet Protocol (IP) address to be used by the device. In some aspects, the selected IP address for the device is a static IP address. The IP address may also be more general as any kind of unique identifier for the device. In some aspects, an endpoint behavior analysis engine (e.g., the enterprise endpoint behavior analysis engine 110) performs the behavior analysis of the device and produces a device type.

In some aspects, reprovisioning, based on the request, the subscription profile for the device with the selected IP address to be used by the device further can include changing a character of IP address assignment in the subscription profile for the device.

At block 310, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does deregister the device from the network.

At block 312, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does reconnect the device to the network.

At block 314, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does assign and transmit the selected IP address to the device.

In some aspects, the method can further include reusing, for a second device, an original IP address that was originally used by the device. In other words, the behavior analysis may indicate the need to replace a device with the second device and in that case, reuse the address assigned to the device.

In some aspects, system for managing addresses for a device can include at least one processor; and a computer-readable storage medium storing instructions which, when executed by the at least one processor, cause the at least one processor to be configured to: receive, at a network component of a network, data regarding a device; perform analysis of the device based on the data; based on the analysis, trigger a request to an address management system for the network; reprovision, based on the request, a subscription profile for the device with a selected address assignment method and Internet Protocol (IP) address to be used by the device; deregister the device from the network; reconnect the device to the network; and assign and transmit the selected IP address to the device. The analysis can include a behavioral analysis to determine a device type when the data does not identify the device type.

In some aspects, a computer-readable storage medium can store instructions which, when executed by at least one processor, cause the at least one processor to be configured to: receive, at a network component of a network, data regarding a device; perform behavior analysis of the device based on the data; based on the behavior analysis, trigger a request to an address management system for the network; reprovision, based on the request, a subscription profile for the device with a selected Internet Protocol (IP) address to be used by the device; deregister the device from the network; reconnect the device to the network; and assign and transmit the selected IP address to the device. The selected IP address for the device can in some aspects be a static IP address or any kind of identifier for the device. An endpoint behavior analysis engine can perform the behavior analysis of the device and produces a device type.

In some aspects, the network component simply performs an active probe or inquiry directly to the device to determine the device type. In this scenario, there is no need to perform the behavior analysis to figure out the device type or other data associated with the device.

In some aspects, a method can include: performing active probing, from a network component of a network, of a device to identify a device type; based on the device type, triggering a request to an address management system for the network; reprovisioning, based on the request, a subscription profile for the device with a selected Internet Protocol (IP) address to be used by the device; deregistering the device from the network; reconnecting the device to the network; and assigning and transmitting the selected IP address to the device.

In some aspects, a system for managing addresses for a device can include: at least one processor; and a computer-readable storage medium storing instructions which, when executed by the at least one processor, cause the at least one processor to be configured to: perform active probing of a device to identify a device type; based on the device type, trigger a request to an address management system for the network; reprovision, based on the request, a subscription profile for the device with a selected Internet Protocol (IP) address to be used by the device; deregister the device from the network; reconnect the device to the network; and assign and transmit the selected IP address to the device.

In some aspects, a computer-readable storage medium can store instructions which, when executed by at least one processor, cause the at least one processor to be configured to: perform active probing of a device to identify a device type; based on the device type, trigger a request to an address management system for the network; reprovision, based on the request, a subscription profile for the device with a selected Internet Protocol (IP) address to be used by the device; deregister the device from the network; reconnect the device to the network; and assign and transmit the selected IP address to the device.

In some aspects, a system for managing addresses for a device can include one or more: means for performing active probing of a device to identify a device type; means for, based on the device type, triggering a request to an address management system for the network; means for reprovisioning, based on the request, a subscription profile for the device with a selected Internet Protocol (IP) address to be used by the device; means for deregistering the device from the network; means for reconnecting the device to the network; and means for assigning and transmit the selected IP address to the device.

Note that any one or more other features described in connection with the passive analysis or use of the behavior analysis as in FIG. 3A can also apply in the context of actively probing the device for device data such as the device type or other data.

FIG. 3B is a flowchart illustrating a process 320 for assigning an IP address to a device. The process 320 can be performed by one or more of a computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof. In general, the process 320 focuses on the operations from the standpoint of a device or the private cellular access client 202.

At block 322, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does connect, from a device, with one or more network component of a network.

At block 324, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does transmit, from the device and to the one or more network component, data regarding the device, wherein the one or more network component: performs behavior analysis of the device based on the data; based on the behavior analysis, triggers a request to an address management system for the network; and reprovisions, based on the request, a subscription profile for the device with a selected Internet Protocol (IP) address to be used by the device.

At block 326, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does detach the device from the one or more network component.

At block 328, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does reconnect the device to the one or more network component.

At block 330, the computing system (i.e., the computing system 400, a packet core 104, an enterprise network 106, an endpoint behavior analysis agent 108, an enterprise endpoint behavior analysis engine 110, enterprise identity and policy management engine 112, an address management system 114, a device 102, and/or any subset of combination thereof) can and does receive, from the one or more network component, the selected IP address to the device.

In another aspect, a system for managing addresses for a device can include at least one processor; and a computer-readable storage medium storing instructions which, when executed by the at least one processor, cause the at least one processor to be configured to: connect, from a device, with one or more network component of a network; transmit, from the device and to the one or more network component, data regarding the device, wherein the one or more network component: performs behavior analysis of the device based on the data; based on the behavior analysis, triggers a request to an address management system for the network; and reprovisions, based on the request, a subscription profile for the device with a selected Internet Protocol (IP) address to be used by the device; detach the device from the one or more network component; reconnect the device to the one or more network component; and receive, from the one or more network component, the selected IP address to the device.

In yet another aspect, a computer-readable storage medium can store instructions which, when executed by at least one processor, cause the at least one processor to be configured to: connect, from a device, with one or more network component of a network; transmit, from the device and to the one or more network component, data regarding the device, wherein the one or more network component: performs behavior analysis of the device based on the data; based on the behavior analysis, triggers a request to an address management system for the network; and reprovisions, based on the request, a subscription profile for the device with a selected Internet Protocol (IP) address to be used by the device; detach the device from the one or more network component; reconnect the device to the one or more network component; and receive, from the one or more network component, the selected IP address to the device.

Example embodiments can be claimed from any one or more of the components described herein such as the example computing system 400, the packet core 104, an enterprise network 106, an endpoint behavior analysis agent 108, and so forth. Any one or more of the features disclosed herein can be applied to operations from one or more of the components.

FIG. 4 illustrates an example computing system 400 includes at least one processing unit, such as a CPU or a processor 410 and connection 405 that couples various system components including system memory 415, such as read-only memory (ROM) or ROM 420 and random access memory (RAM) or RAM 425 to processor 410. Computing system 400 can include a cache 412 of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms. In some instances, multimodal systems can enable a user to provide multiple types of input/output to communicate with computing system 400. Computing system 400 can include communications interface 440, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 440 may also include one or more Global Navigation Satellite System (GNSS) receivers or transceivers that are used to determine a location of the computing system 400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/ pico SIM card, another integrated circuit (IC) chip/card, random access memory (RAM), static RAM (SRAM), dynamic RAM (DRAM), read-only memory (ROM), pro-grammable read-only memory (PROM), erasable program-mable read-only memory (EPROM), electrically erasable programmable read-only memory (EEPROM), flash EPROM (FLASHEPROM), cache memory (L1/L2/L3/L4/ L5/L #), resistive random-access memory (RRAM/Re-RAM), phase change memory (PCM), spin transfer torque RAM (STT-RAM), another memory chip or cartridge, and/ or a combination thereof.

The storage device 430 can include software services, servers, services, etc., that when the code that defines such software is executed by the processor 410, it causes the system to perform a function. In some examples, a hardware service that performs a particular function can include the software component stored in a computer-readable medium in connection with the necessary hardware components, such as processor 410, connection 405, output device 435, etc., to carry out the function. The term "computer-readable medium" includes, but is not limited to, portable or non-portable storage devices, optical storage devices, and various other mediums capable of storing, containing, or carry-ing instruction(s) and/or data. A computer-readable medium may include a non-transitory medium in which data can be stored and that does not include carrier waves and/or tran-sitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "one or more processors configured to," "one or more processors being configured to," "one or more processors configured to," "one or more processors being configured to," or the like indicates that one processor or multiple processors (in any combination) can perform the associated operation(s). For example, claim language reciting "one or more processors configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "one or more processors configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include one or more memories, one or more processors, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/ or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Claim clauses for the first embodiment are as follows:

Clause 1. A method comprising: receiving, at a network component of a network, data regarding a device; performing behavior analysis of the device based on the data; based on the behavior analysis, triggering a request to an address management system for the network; reprovisioning, based on the request, a subscription profile for the device with a selected Internet Protocol (IP) address to be used by the device; deregistering the device from the network; reconnecting the device to the network; and transmitting the selected IP address to the device.

Clause 2. The method of clause 1, wherein the selected IP address for the device is a static IP address.

Clause 3. The method of clause 1 or any previous clause, wherein an endpoint behavior analysis engine performs the behavior analysis of the device and produces a device type.

Clause 4. The method of clause 1 or any previous clause, wherein the network component comprises one of a packet core and an enterprise network.

Clause 5. The method of clause 1 or any previous clause, wherein reprovisioning, based on the request, the subscription profile for the device with the selected IP address to be used by the device further comprises changing a character of IP address assignment in the subscription profile for the device.

Clause 6. The method of clause 1 or any previous clause, further comprising: reusing, for a second device, an original IP address that was originally used by a first device.

Clause 7. The method of clause 1 or any previous clause, wherein the behavior analysis is associated with one or more of a device behavior, the data regarding the device, an artificial intelligence analysis of the data regarding the device.

Clause 8. The method of clause 7 or any previous clause, wherein, when the behavior analysis identifies a device type, triggering, based on the device type, the request to the address management system for the network.

Clause 9. A system for managing addresses for a device, the system comprising: at least one processor; and a computer-readable storage medium storing instructions which, when executed by the at least one processor, cause the at least one processor to be configured to: receive, at a network component of a network, data regarding a device; perform analysis of the device based on the data; based on the analysis, trigger a request to an address management system for the network; reprovision, based on the request, a subscription profile for the device with a selected Internet Protocol (IP) address to be used by the device; deregister the device from the network; reconnect the device to the network; and transmit the selected IP address to the device.

Clause 10. The system of clause 9, wherein the selected IP address for the device is a static IP address.

Clause 11. The system of any of clauses 9-10, wherein an endpoint behavior analysis engine performs the analysis of the device and produces a device type.

Clause 12. The system of any of clauses 9-11, wherein the network component comprises one of a packet core and an enterprise network.

Clause 13. The system of any of clauses 9-12, wherein reprovisioning, based on the request, the subscription profile for the device with the selected IP address to be used by the device further comprises changing a character of IP address assignment in the subscription profile for the device.

Clause 14. The system of any of clauses 9-13, further comprising: reusing, for a second device, an original IP address that was originally used by a first device.

Clause 15. The system of any of clauses 9-14, wherein the analysis is associated with one or more of a device behavior, the data regarding the device, an artificial intelligence analysis of the data regarding the device.

Clause 16. The system of any of clauses 9-15, wherein, when the analysis identifies a device type, triggering, based on the device type, the request to the address management system for the network.

Clause 17. The system of any of clauses 9-16, wherein the analysis comprises a behavioral analysis to determine a device type when the data does not identify the device type.

Clause 18. A computer-readable storage medium storing instructions which, when executed by at least one processor, cause the at least one processor to be configured to: receive, at a network component of a network, data regarding a device; perform behavior analysis of the device based on the data; based on the behavior analysis, trigger a request to an address management system for the network; reprovision, based on the request, a subscription profile for the device with a selected Internet Protocol (IP) address to be used by the device; deregister the device from the network; reconnect the device to the network; and transmit the selected IP address to the device.

Clause 19. The computer-readable storage medium of clause 18, wherein the selected IP address for the device is a static IP address.

Clause 20. The computer-readable storage medium of clause 18 or clause 19, wherein an endpoint behavior analysis engine performs the behavior analysis of the device and produces a device type.

Clause 21. A method comprising: connecting, from a device, with one or more network component of a network; transmitting, from the device and to the one or more network component, data regarding the device, wherein the one or more network component: performs behavior analysis of the device based on the data; based on the behavior analysis, triggers a request to an address management system for the network; and reprovisions, based on the request, a subscription profile for the device with a selected Internet Protocol (IP) address to be used by the device; detaching the device from the one or more network component; reconnecting the device to the one or more network component; and receiving, from the one or more network component, the selected IP address to the device.

Clause 22. A system for managing addresses for a device, the system comprising: at least one processor; and a computer-readable storage medium storing instructions which, when executed by the at least one processor, cause the at least one processor to be configured to: connect, from a device, with one or more network component of a network; transmit, from the device and to the one or more network component, data regarding the device, wherein the one or more network component: performs behavior analysis of the device based on the data; based on the behavior analysis, triggers a request to an address management system for the network; and reprovisions, based on the request, a subscription profile for the device with a selected Internet Protocol (IP) address to be used by the device; detach the device from the one or more network component; reconnect the device to the one or more network component; and receive, from the one or more network component, the selected IP address to the device.

Clause 22. A computer-readable storage medium storing instructions which, when executed by at least one processor, cause the at least one processor to be configured to: connect, from a device, with one or more network component of a network; transmit, from the device and to the one or more network component, data regarding the device, wherein the one or more network component: performs behavior analysis of the device based on the data; based on the behavior analysis, triggers a request to an address management system for the network; and reprovisions, based on the request, a subscription profile for the device with a selected Internet Protocol (IP) address to be used by the device; detach the device from the one or more network component; reconnect the device to the one or more network component; and receive, from the one or more network component, the selected IP address to the device.

Clause 23. A method comprising: performing active probing, from a network component of a network, of a device to identify a device type; based on the device type, triggering a request to an address management system for the network; reprovisioning, based on the request, a subscription profile for the device with a selected Internet Protocol (IP) address to be used by the device; deregistering the device from the network; reconnecting the device to the network; and assigning and transmitting the selected IP address to the device.

Clause 24. A system for managing addresses for a device, the system comprising: at least one processor; and a computer-readable storage medium storing instructions which, when executed by the at least one processor, cause the at least one processor to be configured to: perform active probing of a device to identify a device type; based on the device type, trigger a request to an address management system for the network; reprovision, based on the request, a subscription profile for the device with a selected Internet Protocol (IP) address to be used by the device; deregister the device from the network; reconnect the device to the network; and assign and transmit the selected IP address to the device.

Clause 25. A computer-readable storage medium storing instructions which, when executed by at least one processor, cause the at least one processor to be configured to: perform active probing of a device to identify a device type; based on the device type, trigger a request to an address management system for the network; reprovision, based on the request, a subscription profile for the device with a selected Internet Protocol (IP) address to be used by the device; deregister the device from the network; reconnect the device to the network; and assign and transmit the selected IP address to the device.

Clause 26. A system for managing addresses for a device, the system comprising: means for performing active probing of a device to identify a device type; means for, based on the device type, triggering a request to an address management system for the network; means for reprovisioning, based on the request, a subscription profile for the device with a selected Internet Protocol (IP) address to be used by the device; means for deregistering the device from the network; means for reconnecting the device to the network; and means for assigning and transmit the selected IP address to the device.

What is claimed is:

1. A method comprising:
receiving, at a network component of a network, data regarding a device during an established communication session between the device and the network;
performing behavior analysis of the device based on the data or traffic associated with the device observed during the session;
based on the behavior analysis, determining that the device requires a change in Internet Protocol (IP) address assignment from dynamic to static and triggering a request to an address management system for the network;
reprovisioning, based on the request, a subscription profile for the device with a selected Internet Protocol (IP) address and a corresponding static address assignment characteristic to be used by the device to obtain a reprovisioned subscription profile;
deregistering, based on the reprovisioned subscription profile, the device from the network;
reconnecting the device to the network; and
assigning and transmitting the selected IP address to the device.

2. The method of claim 1, wherein the selected IP address for the device is a static IP address.

3. The method of claim 1, wherein an endpoint behavior analysis engine performs the behavior analysis of the device and produces a device type.

4. The method of claim 1, wherein the network component comprises one of a packet core and an enterprise network.

5. The method of claim 1, wherein reprovisioning, based on the request, the subscription profile for the device with the selected IP address to be used by the device further comprises changing a character of IP address assignment in the subscription profile for the device.

6. The method of claim 1, further comprising:
reusing, for a second device, an original IP address that was originally used by a first device.

7. The method of claim 1, wherein the behavior analysis is associated with one or more of a device behavior, the data regarding the device, an artificial intelligence analysis of the data regarding the device.

8. The method of claim 7, wherein, when the behavior analysis identifies a device type, triggering, based on the device type, the request to the address management system for the network.

9. A system for managing addresses for a device, the system comprising:
at least one processor; and
a computer-readable storage medium storing instructions which, when executed by the at least one processor, cause the at least one processor to be configured to:
receive, at a network component of a network, data regarding a device during an established communication session between the device and the network;
perform analysis of the device based on the data or traffic associated with the device observed during the session;
based on the analysis, determine that the device requires a change in Internet Protocol (IP) address assignment from dynamic to static and trigger a request to an address management system for the network;
reprovision, based on the request, a subscription profile for the device with a selected Internet Protocol (IP) address and a corresponding static address assignment characteristic to be used by the device to obtain a reprovisioned subscription profile;
deregister, based on the reprovisioned subscription profile, the device from the network;
reconnect the device to the network; and
assign and transmit the selected IP address to the device.

10. The system of claim 9, wherein the selected IP address for the device is a static IP address.

11. The system of claim 9, wherein an endpoint behavior analysis engine performs the analysis of the device and produces a device type.

12. The system of claim 9, wherein the network component comprises one of a packet core and an enterprise network.

13. The system of claim 9, wherein reprovisioning, based on the request, the subscription profile for the device with the selected IP address to be used by the device further comprises changing a character of IP address assignment in the subscription profile for the device.

14. The system of claim 9, further comprising:
reusing, for a second device, an original IP address that was originally used by a first device.

15. The system of claim 9, wherein the analysis is associated with one or more of a device behavior, the data regarding the device, an artificial intelligence analysis of the data regarding the device.

16. The system of claim 15, wherein, when the analysis identifies a device type, triggering, based on the device type, the request to the address management system for the network.

17. The system of claim 9, wherein the analysis comprises a behavioral analysis to determine a device type when the data does not identify the device type.

18. A computer-readable storage medium storing instructions which, when executed by at least one processor, cause the at least one processor to be configured to:

receive, at a network component of a network, data regarding a device during an established communication session between the device and the network;

perform behavior analysis of the device based on the data or traffic associated with the device observed during the session;

based on the behavior analysis, determine that the device requires a change in Internet Protocol (IP) address assignment from dynamic to static and trigger a request to an address management system for the network;

reprovision, based on the request, a subscription profile for the device with a selected Internet Protocol (IP) address and a corresponding static address assignment characteristic to be used by the device to obtain a reprovisioned subscription profile;

deregister, based on the reprovisioned subscription profile, the device from the network;

reconnect the device to the network; and assign and transmit the selected IP address to the device.

19. The computer-readable storage medium of claim 18, wherein the selected IP address for the device is a static IP address.

20. The computer-readable storage medium of claim 18, wherein an endpoint behavior analysis engine performs the behavior analysis of the device and produces a device type.

\* \* \* \* \*